US008874561B2

(12) United States Patent
Heinzel et al.

(10) Patent No.: US 8,874,561 B2
(45) Date of Patent: Oct. 28, 2014

(54) TIME SERIES DATA MANAGEMENT

(75) Inventors: Thomas Heinzel, San Francisco, CA (US); Stefan Foerster, Hockenheim (DE)

(73) Assignee: SAP SE, Walldorf (DE)

( * ) Notice: Subject to any disclaimer, the term of this patent is extended or adjusted under 35 U.S.C. 154(b) by 2061 days.

(21) Appl. No.: 10/742,832

(22) Filed: Dec. 23, 2003

(65) Prior Publication Data
US 2004/0230445 A1 Nov. 18, 2004

Related U.S. Application Data

(60) Provisional application No. 60/458,415, filed on Mar. 31, 2003.

(51) Int. Cl.
*G06F 17/30* (2006.01)
*G06Q 10/06* (2012.01)

(52) U.S. Cl.
CPC ............ *G06Q 10/06* (2013.01); *G06F 17/30* (2013.01)
USPC .................................................. 707/725

(58) Field of Classification Search
USPC ........... 707/2, 1, 100, 102, 200, 3, 802, 804, 707/806; 705/7
See application file for complete search history.

(56) References Cited

U.S. PATENT DOCUMENTS

| | | | |
|---|---|---|---|
| 5,201,046 A | | 4/1993 | Goldberg et al. |
| 5,519,861 A | * | 5/1996 | Ryu et al. ........................ 707/1 |
| 5,787,414 A | * | 7/1998 | Miike et al. ..................... 707/2 |
| 6,349,309 B1 | * | 2/2002 | Aggarwal et al. ............ 707/200 |
| 7,200,584 B2 | * | 4/2007 | Sakurai ........................... 706/58 |
| 2002/0091675 A1 | * | 7/2002 | Shimokawa et al. ............ 707/1 |
| 2002/0133368 A1 | * | 9/2002 | Strutt et al. ...................... 705/1 |
| 2002/0178155 A1 | * | 11/2002 | Sakurai ............................ 707/3 |
| 2003/0018502 A1 | | 1/2003 | Rodriguez |
| 2004/0267782 A1 | * | 12/2004 | Nakano et al. ................ 707/100 |
| 2005/0120039 A1 | * | 6/2005 | Amys et al. ................... 707/102 |
| 2006/0010142 A1 | * | 1/2006 | Kim et al. ..................... 707/100 |

FOREIGN PATENT DOCUMENTS

| | | |
|---|---|---|
| EP | 1 258 812 A1 | 11/2002 |
| WO | WO 01/67309 A2 | 9/2001 |

OTHER PUBLICATIONS

Time Series the next step of telecommunications data management, Informix white paper, 1996, pp. 1-27.*
SAP NetWeaver™, pp. 1-8, © 2003.
SAP APO with SAP liveCache 7.4, pp. 1-4, © 2003.
U.S. Appl. No. 10/742,833, filed Dec. 23, 2003, entitled "Alert Notification Engine".
U.S. Appl. No. 10/742,794, filed Dec. 23, 2003, entitled "Alert Engine".
U.S. Appl. No. 10/742,793, filed Dec. 23, 2003, entitled "Order Document Data Management".

(Continued)

*Primary Examiner* — Sherief Badawi
(74) *Attorney, Agent, or Firm* — Finnegan, Henderson, Farabow, Garrett & Dunner, LLP

(57) ABSTRACT

Methods and apparatus, including computer program products, are provided for storing data in a database. The data, whose structures are configurable, may comprise a time series, the time series comprising a set of key figure values of individual time periods, the key figure values being associated with a combination of parameter values, wherein the set of key figure values is organized in a number of configurable clusters.

24 Claims, 2 Drawing Sheets

(56) References Cited

OTHER PUBLICATIONS

Anonymous, "Time Series: The Next Step for Telecommunications Data Management," Informix White Paper, 1999, pp. 1-27.

Ramez Elmasri et al., "Implementation Options for Time-Series Data," Temporal Databases: Research and Practices Springer-Verlag, Berlin, Germany, 1998, pp. 115-128.

Werner Dreyer et al., "An Object-Oriented Data Model for a Time Series Management System," Scientific and Statistical Database Management, Proceedings, Seventh International Working Conference, Charlottesville, VA, Sep. 28-30, 1994, pp. 186-195.

Jong Soo Kim et al., "On Effective Data Clustering in Bitemporal Databases," Proceedings, Fourth International Workshop, Daytona Beach, FL, May 10-11, 1997, pp. 54-61.

EPO Communication, mailed Feb. 10, 2006 (4 pages).

Anonymous, "TPC Benchmark D Standard Specification Revision 2.1," Transaction Processing Performance Council, Retrieved from the Internet: http://www.tpc.org/tpcd/spec/tpcd_current.pdf [retrieved Jun. 9, 2006], Feb. 16, 1998, pp. 1-20.

Richard Hull, "Semantic Database Modeling: Survey, Applications, and Research Issues," ACM Computing Surveys, vol. 19, No. 3, Sep. 1987, pp. 201-260.

David DeWitt et al., "Parallel Database Systems: The Future of High Performance Database Systems," Communications of the Association of Computing Machinery, vol. 35, No. 6, Jun. 1, 1992, pp. 85-98.

Doron Rotem et al., "Physical Organization of Temporal Data," Proceedings of the International Conference on Data Engineering, Los Angeles, CA, Feb. 3-5, 1987, IEEE Computer Society Press, vol. Conf. 3, Feb. 1987, pp. 547-553.

Ilsoo Ahn et al., "Partitioned Storage for Temporal Databases," Information Systems, vol. 13, No. 4, Jan. 1988, pp. 369-391.

Thomas Zurek, "Optimal Interval Partitioning for Temporal Databases," Proceedings of the Third Basque International Workshop on Biarritz, France, Jul. 2-4, 1997, Los Alamitos, CA, IEEE Computer Society, Jul. 2, 1997, pp. 140-147.

Communication and Search Report of the European Patent Office, dated Jun. 28, 2006 (10 pages).

\* cited by examiner

TIME SERIES DATA MANAGEMENT

This application claims priority under 35 U.S.C. §119 based on U.S. Provisional Application No. 60/458,415, filed Mar. 31, 2003, the complete disclosure of which is incorporated herein by reference.

FIELD OF THE INVENTION

This application relates to time series data management (TSDM), which is a generic module to store and retrieve time series data that is developed for high performance and high volume scenarios of supply chain management (SCM) and planning.

BACKGROUND INFORMATION

A time series may be defined as a list of key figure values for consecutive time periods that is attached to a combination of parameter values (characteristics). The characteristics, the key figure name and the time period form a semantic key to identify a single key figure value. Such a time series may be the number of items sold per time interval. The time interval may be a day, a week, two months, etc. Parameters may be attached to the time series for characterizing the time series, for example denoting the store, or the item concerned.

Another example of time series are meteorological data useful for weather forecast. Yet another example is control and measurement data of a complex chemical production plant.

The simplest way of storing time series data in a data base table follows from the definition of the time series: the key is formed by the parameter values and the time period and an attribute stores the time series value.

A problem arises when a time series among a large amount of data is to be accessed in a data base. Then, a straightforward storing of data relating to time series is no longer the method of favor.

SUMMARY OF THE INVENTION

It is an object of the present invention to provide a method of storing time series data, which is designed for high volume and high throughput scenarios.

In accordance with an embodiment of the invention, a method of storing data in a database is provided, wherein the data, whose structures may be configurable, may comprise a time series, the time series comprising a set of key figure values of individual time periods, the key figure values being associated with a combination of parameter values, wherein the set of key figure values is organized in a number of configurable clusters.

Advantageous implementations can include one or more of the following features.

Values for many time periods may be stored into adjacent fields of one entry.

Such a clustering leads to enhanced performance for data read and write operations.

The numbers of individual time periods may be selected according to semantic criteria. The clusters may be configured according to time aggregates, each time aggregate comprising a number of the individual time periods, respectively.

Data which is related to each other may be placed at the same location.

Alternatively, the numbers of individual time periods may be selected according to numeric criteria.

Each time period may have the same fixed length. Alternatively, each time period may be individually described by begin and end time.

In accordance with a further embodiment of the invention, the time series data may be partitioned across a plurality of areas, each time series data area may comprise a set of tables used for managing a partition of the data.

Data separation into data areas with these tables leads to smaller tables and to a better performance.

Additionally according to the invention, pointers to predefined documents of a document management service may be stored in relation to time series data.

A further embodiment of the invention relates to log changes to key figure values in predefined tables, these tables again being organized to support clustering and data separation into multiple data areas.

In particular, the invention also may comprise computer systems for performing the inventive methods.

Furthermore, the invention may comprise computer-readable storage media comprising program code for performing the inventive methods, when loaded into a computer system.

DESCRIPTION OF THE EMBODIMENTS

Figure 1:
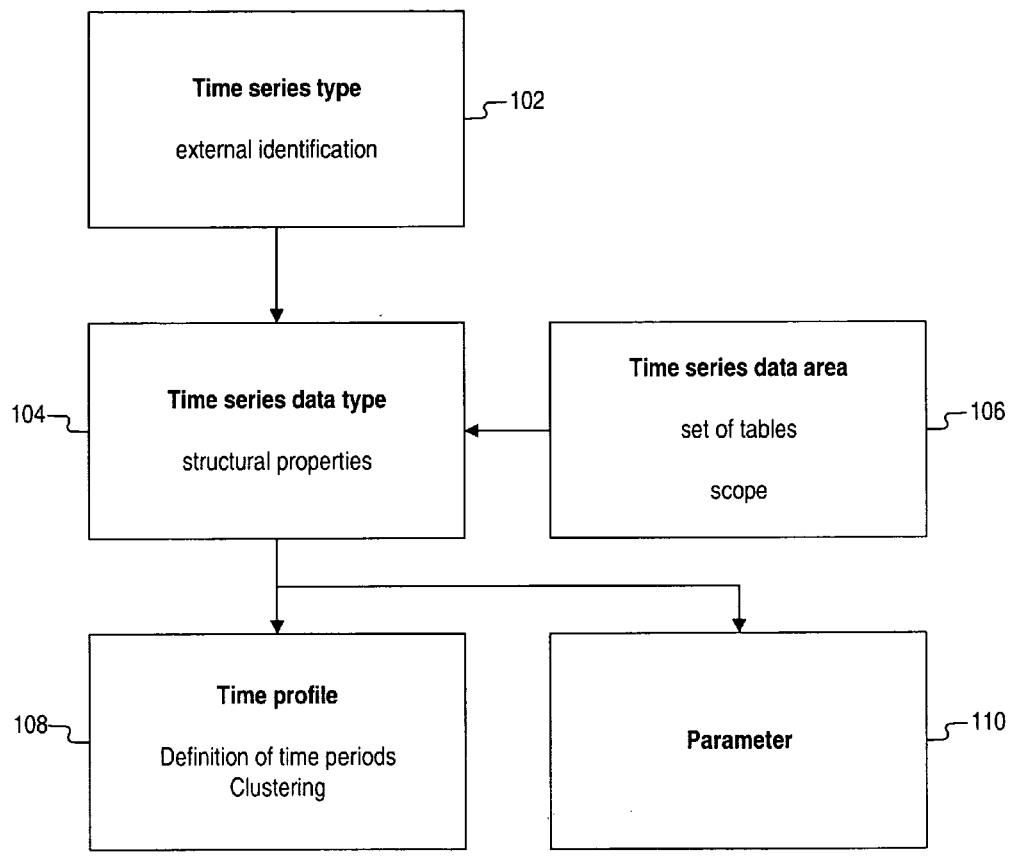
FIG. 1 illustrates an embodiment of the present invention.

FIG. 1 shows a preferred embodiment of the present invention, used with a supply chain management (SCM) application (SAP mySAP SCM).

Exemplary modules include: (1) time series type 102; (2) time series data type 104; (3) time series data area 106; (4) time profile 108; and (5) parameter 110. The data management module used to store and retrieve time series data is referred to as Time Series Data Management (TSDM).

For an SCM application, the TSDM may support location, product and version as basic characteristics. Other and additional characteristics and their data formats can be configured.

Time series data in TSDM may be stored in different versions to distinguish different views or status of a set of data. Within TSDM there may be no semantic properties associated with individual versions. For SCM purposes versions might be used as planning versions.

Key figures, characteristics and their data formats can be freely defined. By way of a non-limiting example, the TSDM is generic in the sense that it works independent of the semantics of characteristics and key figures.

The TSDM may support arbitrary definitions of sequences of time periods for which data can be stored. Each individual time period may have a number as an identifier. Usually the definitions of individual time periods may be equidistant, but other definitions are possible. Typical time periods may be hours, days, weeks, months, and years. Freely defined periods as well as multiples of elementary periods are possible.

It is also possible to use just the numbers as identifiers for an abstract series of key figure values without relationship to time.

In addition, each time series may have one or several status, which are not a characteristic (key) but attributes. The status can e.g., be used to model valid and invalid status of data in a data staging process.

The TSDM may also support storage of pointers to documents from a document management service.

The Time Series Data Management may be designed for high volume and high throughput scenarios. Two mechanisms may contribute to fulfill this goal, namely clustering, and partitioning.

Clustering may especially be used for performance reasons. Hereby, key figure values may be stored in clustered format with respect to the time dimension. Thus, in one example, in the corresponding database tables, key figure values for different time periods are not separated by a an explicit key field that denotes the individual time period, but may be stored in multiple adjacent table fields of the same table entry.

The clustering mechanism, e.g., the grouping of time series values for each characteristic combination and each key figure in one or a few table entries, may limit the number of entries that need to be treated in each access to the database by a factor that corresponds to the cluster size.

Clustering may also reduce the data volume: memory requirement for each cluster is: K+S*V; memory requirement for each key figure value is: K/S+V; and with V=length of key figure value field, K=length of key for each cluster, S=cluster size.

The value of K may be relatively small, so that the data volume needed to store a key figure value approaches that of the size of the key figure value itself with increasing cluster size S.

Time periods, characteristic combinations and key figure values may be normalized and may be stored in different tables. This distribution of data may help reduce the overall data volume.

Clustering can be done according to various rules, for example, one can group either a fixed number of key figure values in each entry of the database table. In this case the cluster size is arbitrary up to the limit imposed by the maximum width of database tables. Or, one can group entries according to properties of larger time intervals, e.g., all individual periods of one week or one month. In this case a semantic relation between individual time periods and cluster time period gives the cluster size, e.g., 24 for hours in a day or between 28 and 31 for days in a month.

To tune performance, the clustering mechanism and the cluster size may have to be chosen carefully to align it with the way that algorithms access the data. The trade-off may be between reading too many entries and reading too large a data volume. Clustering may make sense only in scenarios where multiple key figure values are regularly read and written together. TSDM can also store data in un-clustered format.

One could also choose a dimension other than time for clustering and treat this dimension accordingly. However, for SCM applications, time wise clustering may be generally beneficial, because data access is usually for many time periods.

Partitioning of data may mean to distribute time series data stored in TSDM by using multiple so-called time series data areas (e.g., 106). Each time series data area 106 may be a set of tables that may be used to manage a portion of the total volume of time series data. The distribution of data across data areas may depend on conditions on the keys of the time series data, i.e., the characteristics.

The introduction of time series data areas may allow limiting the amount of data that has to be stored in individual tables. Since time series data areas (e.g., 106) may not require manual coding but may be generated, and because they may be hidden from the applications that use TSDM, they can be introduced by consultants/administrators after the setup of a system at the customer site to improve performance.

The time series data may be split according to configurable conditions on the characteristic values, e.g., all possible characteristics combinations may be split into subsets each with their own data area. Beyond reducing the amount of data in tables to manageable size, one may align the split with the way that algorithms access the data in order to further improve performance, e.g., defining separate data areas for individual locations if an algorithm computes for one location at a time.

For large data volumes this split into multiple data areas may greatly improve performance, while for small data volumes a multitude of tables that need to be accessed sequentially might lead to worse performance.

The clustering and data area mechanisms may be hidden from the applications that use the TSDM. The APIs of the TSDM may be independent of these features.

By way of a non-limiting example, the TSDM provides a mechanism to log changes to key figure values. This historical data may be stored in separate tables. Whether historical versions of data need to be stored can be configured or determined by the application on a case-by-case basis through the APIs of the TSDM.

The time series type 102 may model a group of time series as a single business object that is used externally by applications to specify the specific class of time series data they want to access. Further, the time series type may specify the time series data type that is an TSDM internal object giving the structure of the particular time series data.

The time series data type 104 may model the technical properties and structure of a set of time series, and specifies characteristics, key figures and a time profile. Further, the time series data type may specify the structural properties of the data storage for the related time series data areas, in particular, for example, the structure of the database tables for key figure values, characteristics, states, notes and history data. Time series data types may be hidden from the application; only the time series type is relevant for data access.

The time series data area 106 may specify a set of tables to be used for storage of time series of a particular time series data type. Multiple time series data areas may be used to partition large amounts of data into several sets of tables. By design, the scope of a time series data area may always be limited by the corresponding time series data type, which describes its technical structure. The validity of a time series data area can be limited to specific time series types and specific characteristic values or characteristic value combinations.

In the same way as the time series data types, time series data areas may be hidden from the application.

The time profile 108 may define granularity, start and end of a sequence of time periods and the properties of the clustering mechanism.

A parameter 110 may define name and technical properties of a key figure or characteristic for TSDM. Parameters may also be used in other SCM data management components and may be a unifying element for the description of corresponding algorithms and user interfaces. Parameters may serve as an abstraction from technical data properties while providing some additional meta-attributes.

Time profiles, time series data types and time series data areas each may exist in an inactive version that describes their definition and in an active version that reflects the currently used state of the definition. Activation of these meta-data objects may generate corresponding code and data structures and may copy the relevant table entries from the inactive version (definition) into the active version (run-time usage).

By way of a non-limiting example, the TSDM may provide one or more APIs for the following functions: (1) create/change time series data; (2) read time series data by time series type, selection of characteristics, key figures and time; (3) read time series history by time series type, selection of characteristics, key figures and time; (4) delete time series data by time series type, selection of characteristics, key figures and time; (5) delete time series history by time series type, selection of characteristics, key figures and time; and/or (6) create and activate time series data areas. This may be used by an application when introducing new characteristic combinations that should have their data stored separately for performance reasons.

All functions may be suited for access of multiple time series across characteristic combinations and key figures, while the time series type is fixed. TSDM may allow reading of data in time series format from external applications through special APIs, e.g., the SCM Order Data Management: the Order Data Management provides a special API to read quantities in aggregated format.

By way of a non-limiting example, the TSDM has user interfaces for the following configuration tasks: maintain time series type; maintain time series data type; maintain time series time profile; maintain time series data area; activate time series profile; activate time series data type; activate time series data area; and/or copy data between time series data areas in order to introduce new time series data areas when data is already present By way of example, the following time series types are provided in a typical SCM application: demand, In-Transits with daily time periods; and forecasting key figures with daily and weekly time periods.

Users may build a multitude of time series types for various planning situations.

Figure 2:
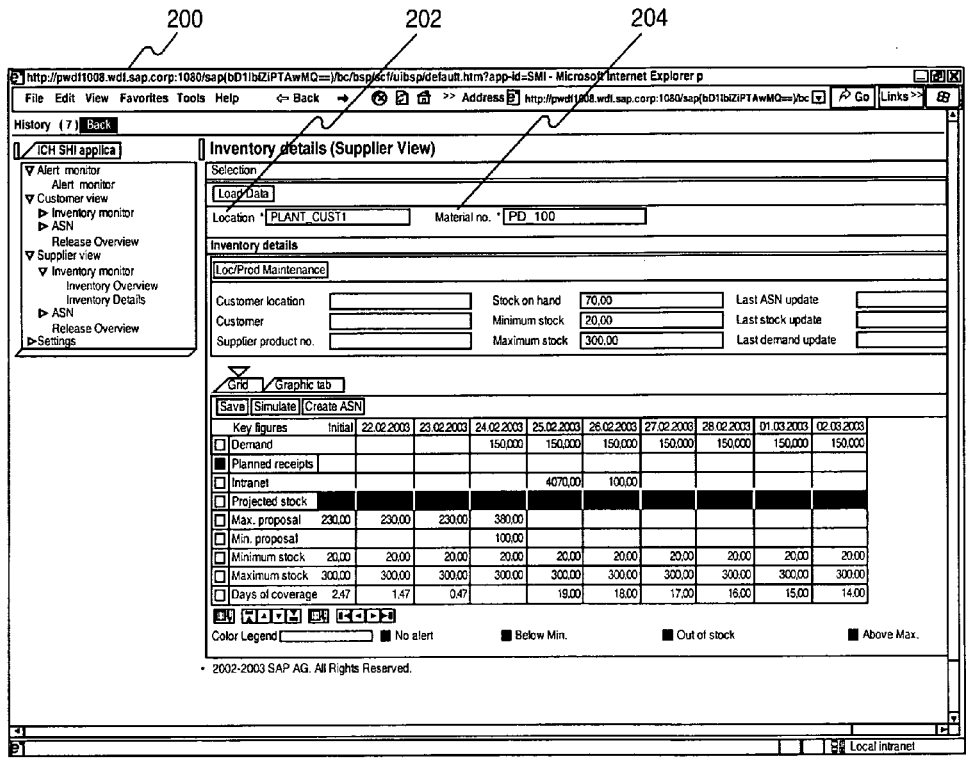
FIG. 2 illustrates, by way of example, a screen print of a TSDM application.

FIG. 2 shows an exemplary screen shot 200 of data stored in TSDM in the context of an Inventory Collaboration Hub (my SAP SCM ICH) front end-application. The exemplary screen shows data for an exemplary plant 202, denoted as PLANT_CUST1. The figures may represent the planning for an item 204, denoted as PD_100 in FIG. 2. The time period of the time series may be one day. The key figures in this example are: Demand; In-Transit; Max. Proposal; Min. Proposal; Maximum Stock; Minimum Stock; Days of Coverage.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller may be coupled to a hard disk drive suitable for storing executable computer programs, including programs embodying the present technique. The I/O controller may be coupled by means of an I/O bus to an I/O interface. The I/O interface may receive and transmits in analog or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-readable storage medium comprising program code, which when executed on a processor causes the processor to perform a method, the method comprising:
  storing data in a database designed for supply chain management and planning scenarios, wherein the data, whose structures are configurable, comprise of a time series;
  providing a set of key figure values, each key figure value in the set of key figure values being associated with an individual time period, wherein the time series comprises two or more consecutive individual time periods; and
  associating the set of the key figure values with a combination of parameter values,
  wherein the set of key figure values is organized and stored in a number of configurable clusters based on the association of the key figure values and the individual time periods in the time series, a size of a configurable cluster being based on either (i) a number of key figure values in the set of key figure values in each entry in a database table within the database or (ii) a semantic relation between the individual time periods and a cluster time period.

2. The method of claim 1, wherein values for several time periods are stored into adjacent fields of one entry.

3. The method of claim 1, wherein the numbers of individual time periods are selected according to semantic criteria.

4. The method of claim 3, wherein the clusters are configured according to time aggregates, each time aggregate comprising a number of the individual time periods, respectively.

5. The method of claim 4, wherein the numbers of individual time periods are selected according to numeric criteria.

6. The method of claim 1, wherein each time period has the same fixed length.

7. The method of claim 1, wherein each time period can be individually described by begin and end time.

8. The method of claim 1, wherein data which is related to each other is placed at the same location.

9. The method of claim 1, wherein the time series data is partitioned across a plurality of areas, each time series data area comprising a set of tables useful for managing a partition of the data.

10. The method of claim 1 further comprising storing pointers to predefined documents from a document management service in relation to the time series.

11. The method of claim 1, wherein a change to the set of the key figure values is logged in a predefined table.

12. The method of claim 11, wherein the tables are organized in a number of configurable clusters, and are partitioned across a plurality of areas.

13. A computer-readable storage medium comprising instructions, which when executed on a processor cause the processor to store a configurable database structure used to design supply chain management and planning scenarios, the database structure comprising:
   time series data,
   wherein the time series data comprises a set of key figure values, each key figure value in the set of key figure values being associated with an individual time period and the time series further comprising two or more consecutive individual time periods,
   wherein the set of the key figure values are associated with a combination of parameter values, and
   wherein the set of key figure values is organized and stored in a number of configurable clusters based on the association of key figure values and the individual time periods in the time series, a size of a configurable cluster being based on either (i) a number of key figure values in the set of key figure values in each entry in a database table within the database structure or (ii) a semantic relation between the individual time periods and a cluster time period.

14. The computer-readable storage medium of claim 13, wherein values for several time periods are stored into adjacent fields of one entry.

15. The computer-readable storage medium of claim 13, wherein the numbers of individual time periods are selected according to semantic criteria.

16. The computer-readable storage medium of claim 15, wherein the clusters are configured according to time aggregates, each time aggregate comprising a number of the individual time periods, respectively.

17. The computer-readable storage medium of claim 16, wherein the numbers of individual time periods are selected according to numeric criteria.

18. The computer-readable storage medium of claim 13, wherein each time period has the same fixed length.

19. The computer-readable storage medium of claim 13, wherein each time period can be individually described by begin and end time.

20. The computer-readable storage medium of claim 13, wherein data which is related to each other is placed at the same location.

21. The computer-readable storage medium of claim 13, wherein the time series data is partitioned across a plurality of areas, each time series data area comprising a set of tables useful for managing a partition of the data.

22. The computer-readable storage medium of claim 13 further comprising pointers to predefined documents from a document management service in relation to the time series data.

23. The computer-readable storage medium of claim 13, wherein a change to the set of the key figure values is logged in a predefined table.

24. The computer-readable storage medium of claim 23, wherein the tables are organized in a number of configurable clusters, and are partitioned across a plurality of areas.

* * * * *